(12) United States Patent
Paivansalo

(10) Patent No.: US 11,543,654 B2
(45) Date of Patent: Jan. 3, 2023

(54) LENS MODULE AND SYSTEM FOR PRODUCING IMAGE HAVING LENS MODULE

(71) Applicant: AAC Optics Solutions Pte. Ltd., Singapore (SG)

(72) Inventor: Eero Sakari Paivansalo, Tampere (FI)

(73) Assignee: AAC Optics Solutions Pte. Ltd., Singapore (SG)

( * ) Notice: Subject to any disclaimer, the term of this patent is extended or adjusted under 35 U.S.C. 154(b) by 160 days.

(21) Appl. No.: 17/023,355

(22) Filed: Sep. 16, 2020

(65) Prior Publication Data

US 2022/0082820 A1 Mar. 17, 2022

(51) Int. Cl.
| | |
|---|---|
| *G02B 27/00* | (2006.01) |
| *G02B 3/00* | (2006.01) |
| *G02B 5/00* | (2006.01) |
| *G02B 7/02* | (2021.01) |
| *H04N 5/225* | (2006.01) |

(52) U.S. Cl.
CPC ....... *G02B 27/0025* (2013.01); *G02B 3/0062* (2013.01); *G02B 5/005* (2013.01); *G02B 7/021* (2013.01); *H04N 5/2253* (2013.01); *H04N 5/2254* (2013.01)

(58) Field of Classification Search
CPC .. G02B 27/0025; G02B 3/0062; G02B 5/005; G02B 7/021; H04N 5/2253; H04N 5/2254; H01L 27/14627
See application file for complete search history.

(56) References Cited

U.S. PATENT DOCUMENTS

| | | | | | |
|---|---|---|---|---|---|
| 5,581,379 | A | * | 12/1996 | Aoyama | G02F 1/133526 349/5 |
| 8,804,255 | B2 | * | 8/2014 | Duparre | G02B 7/003 359/784 |
| 9,077,880 | B2 | * | 7/2015 | Ferraris | H01L 27/14627 |
| 9,411,136 | B2 | * | 8/2016 | Ferraris | G02B 13/0055 |
| 9,647,150 | B2 | * | 5/2017 | Blasco Claret | H01L 31/02327 |
| 2005/0141106 | A1 | * | 6/2005 | Lee | G02B 7/023 359/808 |
| 2007/0108578 | A1 | * | 5/2007 | Watanabe | H01L 27/14627 257/680 |
| 2009/0109318 | A1 | * | 4/2009 | Chang | H04N 5/2257 348/340 |
| 2009/0122178 | A1 | * | 5/2009 | Kwon | H04N 5/2257 348/340 |
| 2010/0053781 | A1 | * | 3/2010 | Wang | G02B 7/021 359/819 |

(Continued)

*Primary Examiner* — Chiawei Chen
(74) *Attorney, Agent, or Firm* — W&G Law Group

(57) ABSTRACT

The present invention discloses a lens module and a system for producing an image. The lens module includes a print circuit board, a spacer, attached onto the print circuit board, and the spacer having a through hole; a lens assembly, supported by the spacer and covered the through hole; an image sensor, mounted on the print circuit board and electrically connected with the print circuit; the lens assembly is configured for capturing light reflected by an object and transmitting the light into the image sensor; the image sensor is configured for converting the light into raw image signals. The lens module may be a simple optics module and thinner than a related lens module.

12 Claims, 9 Drawing Sheets

(56) References Cited

U.S. PATENT DOCUMENTS

| | | | |
|---|---|---|---|
| 2011/0292271 A1* | 12/2011 | Lin | G02B 13/0085 |
| | | | 257/E31.127 |
| 2013/0188161 A1* | 7/2013 | Kajiyama | G02B 3/0062 |
| | | | 355/55 |
| 2014/0090687 A1* | 4/2014 | Den Boer | G02B 3/0056 |
| | | | 136/246 |
| 2014/0118516 A1* | 5/2014 | Suzuki | H04N 5/2254 |
| | | | 348/374 |
| 2014/0248736 A1* | 9/2014 | Oganesian | H01L 27/14683 |
| | | | 438/65 |
| 2015/0063685 A1* | 3/2015 | Chen | G06N 3/0454 |
| | | | 382/156 |
| 2015/0084150 A1* | 3/2015 | Pan | H01L 31/02005 |
| | | | 257/459 |
| 2016/0133762 A1* | 5/2016 | Blasco Claret | H04N 9/04557 |
| | | | 438/69 |
| 2016/0218129 A1* | 7/2016 | Liu | H01L 27/14687 |
| 2017/0168265 A1* | 6/2017 | Du | G02B 13/16 |
| 2017/0195534 A1* | 7/2017 | Jeong | H04N 5/374 |
| 2018/0063388 A1* | 3/2018 | Hsu | G02B 13/001 |
| 2020/0322507 A1* | 10/2020 | Chen | H04N 5/22541 |

\* cited by examiner

LENS MODULE AND SYSTEM FOR PRODUCING IMAGE HAVING LENS MODULE

FIELD OF THE PRESENT INVENTION

The present invention relates generally to imaging lens. More particularly, this invention relates to a lens module and a system for producing an image having such lens module.

DESCRIPTION OF RELATED ART

A related camera module has many lens elements to improve field curvature and distortion. High quality lenses can have even 7 lens elements. The thickness of the related camera module is usually more than 5 mm with 7 elements. The related camera modules have lenses with high thickness, which is not suitable for new mobile terminal, which becomes thinner and thinner.

Therefore, it is necessary to provide a new lens module and a system for solving above mentioned problem.

SUMMARY

In one aspect of the present disclosure, a lens module, comprises: a print circuit board, a spacer, attached onto the print circuit board, and the spacer having a through hole; a lens assembly, supported by the spacer and covered the through hole; an image sensor, mounted on the print circuit board and electrically connected with the print circuit; wherein, the lens assembly is configured for capturing light reflected by an object and transmitting the light into the image sensor; the image sensor is configured for converting the light into raw image signals.

In another aspect of the present disclosure, a system for producing image, comprises: a lens module, comprising: a print circuit board, a spacer, attached onto the print circuit board, and the spacer having a through hole; a lens assembly, supported by the spacer and covered the through hole; an image sensor, mounted on the print circuit board and electrically connected with the print circuit; wherein, the lens assembly is configured for capturing light reflected by an object and transmitting the light into the image sensor; the image sensor is configured for converting the light into raw image signals; a processor, electrically connected with the image sensor, the processor configured for receiving the raw image signals from the image sensor and pre-storing object image signals; a neural network, coupled to the processor, and configured for: receiving the raw image signals; receiving the object image signals; training the neural network, correcting the raw image signals according to the object image signals; outputting an object image.

DETAILED DESCRIPTION OF THE EXEMPLARY EMBODIMENTS

Hereinafter, the present invention will be further described with reference to the accompanying drawings and embodiments.

Embodiment 1

Figure 1:
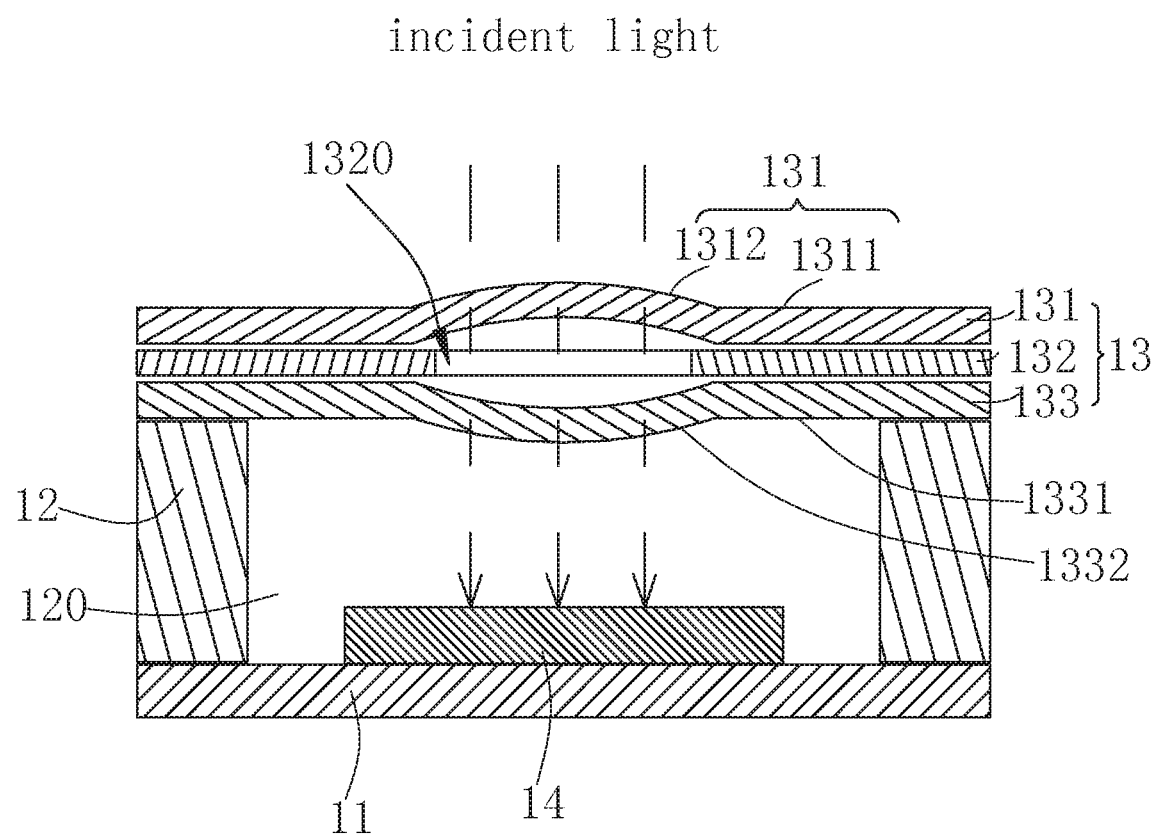
FIG. 1 is a schematically cut-away view of a lens module according to the first embodiment of the present invention.

As shown in FIG. 1, a lens module 100 in the present invention includes a circuit board 11, a spacer 12 having a through hole 120 penetrating through the spacer 12 assembled with the circuit board 11, a lens assembly 13 fixed to the spacer 12 and covering on the through hole 120, and an image sensor 14 attached onto the circuit board 11. The lens assembly 13 is configured to capture the light reflected by the object and transmit the incident light into the image sensor 14. The image sensor 14 then converts the incident light into electric signal. The image sensor 14 is disposed in the through hole 120.

The spacer 12 may be cylinder shaped, and the through hole 120 penetrate through the spacer 12. One end of the spacer 12 is attached onto the circuit board 11, and the other end of the spacer 12 is configured to support the lens assembly 13.

The lens assembly 13 includes a first lens 131, a second lens 133 and an aperture sheet 132 sandwiched between the first lens 131 and the second lens 133. The first lens 131, the second lens 133 both have a fixing portion 1311, 1331 fixed to the end of the spacer 12 and an imaging portion 1312, 1332 for capturing the light. The fixing portion 1311,1331 surrounds the imaging portion 1312, 1332, respectively. The aperture sheet 132 defines an aperture window 1320 for transmitting the light, corresponding to the imaging portion 1312, 1322. The aperture sheet 132 may be coated with infrared cut filter coating. The lens array may be curved shaped. The aperture window 1320 may be a transparent area made of transparent material.

With such configuration, the lens module 100 has two lenses and the image captured by the lens module and then is processed by a neural network. The more field curvature and distortion can be tolerated due to neural network process. Thus, the thickness of the lens module can be thinner.

Embodiment 2

Figure 2:
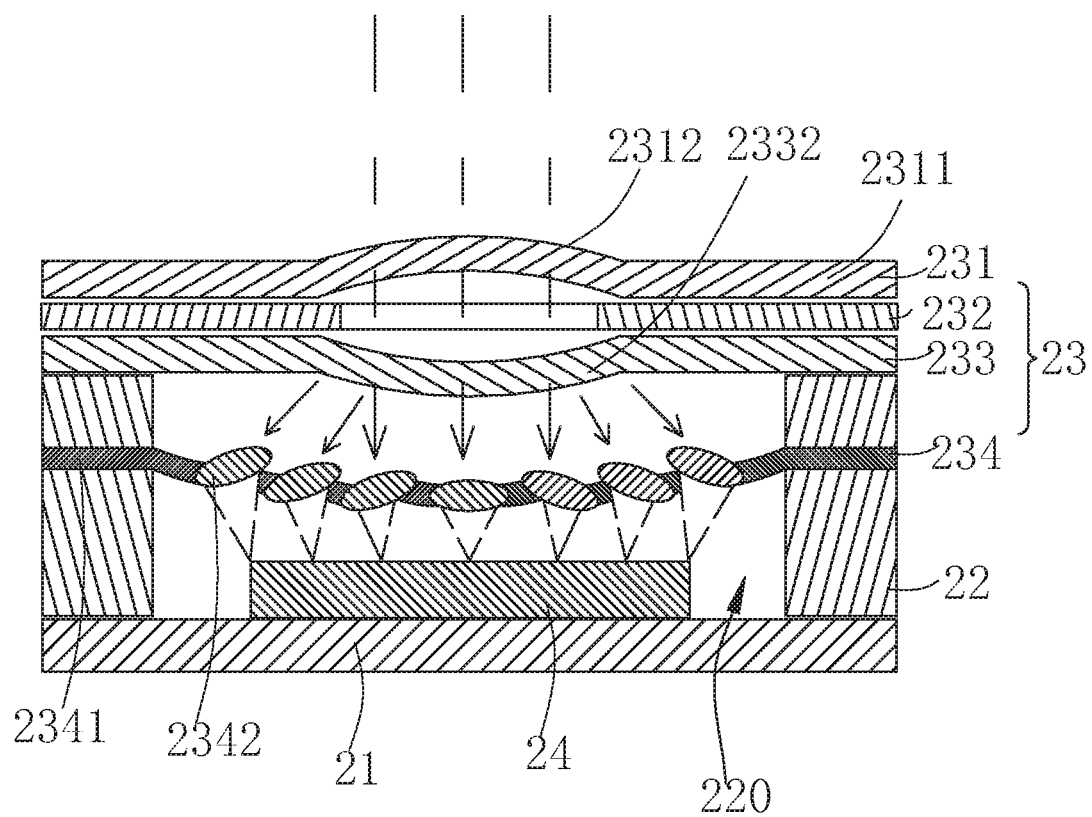
FIG. 2 is a schematically cut-away view of a lens module according to the second embodiment of the present invention.

In this embodiment, as shown in FIG. 2, most of the elements of the lens module 200 are same as those in Embodiment 1. Only one difference is presented in EMBODIMENT 2, which is detailed below.

In EMBODIMENT 2, the lens assembly 23 further includes a micro-lens array 234. The micro-lens array 234 includes a plurality of micro-lenses 2342 and a periphery 2341 surrounding the micro-lenses 2342. The micro-lenses array 234 is received in the through hole 220 of the spacer 22 and fixed to the spacer 22 via the periphery 2341. The micro-lens array 234 is spaced apart from the second lens 233 with the micro-lenses 2341 disposed corresponding to the imaging portion 2312,2332. The incident light from the first lens 231 and the second lens 233 are captured by the micro-lenses and then transmitted to the image sensor 24.

With such configuration, the images captured by the micro-lenses can be combined into a composite image by the neural network, it allows more field curvature and distortion to be tolerated due to neural network.

Embodiment 3

Figure 3:
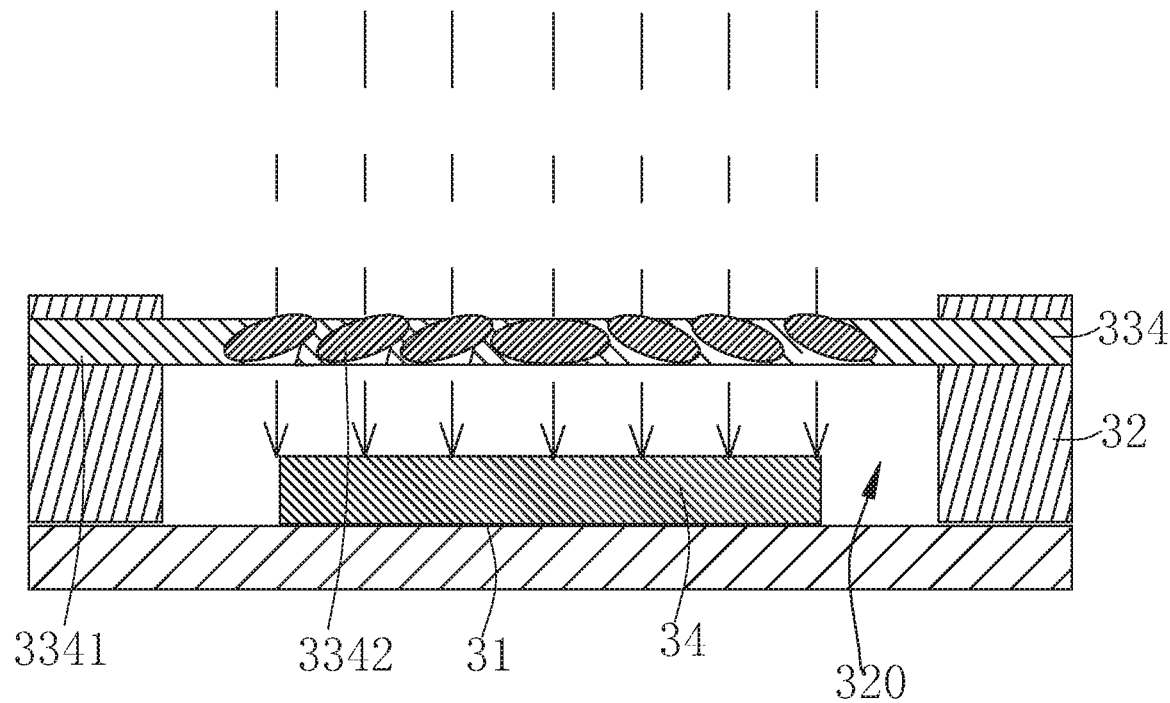
FIG. 3 is a schematically cut-away view of a lens module according to the third embodiment of the present invention.

In this embodiment, as shown in FIG. 3, most of the elements of the lens module 300 are same as those in Embodiment 1. However, the difference existed in EMBODIMENT 3 is detailed as below.

In EMBODIMENT 3, the lens assembly 33 includes only the micro-lens array 334. The micro-lens array 334 includes the plurality of micro-lenses 3342 and the periphery 3341 surrounding the micro-lenses 3342. The micro-lens array 334 may be used as the aperture sheet. The micro-lenses are received in the through hole 320 and corresponding to the image sensor 34. In this embodiment, the image sensor 34 is a flat image sensor. The incident light is captured by the micro-lenses 3342, and then transmitted to the image sensor 34. The image sensor 34 obtains a plurality of image signals, and then the individual images through micro-lens array can be combined into the composite image by neural network.

Embodiment 4

Figure 4:
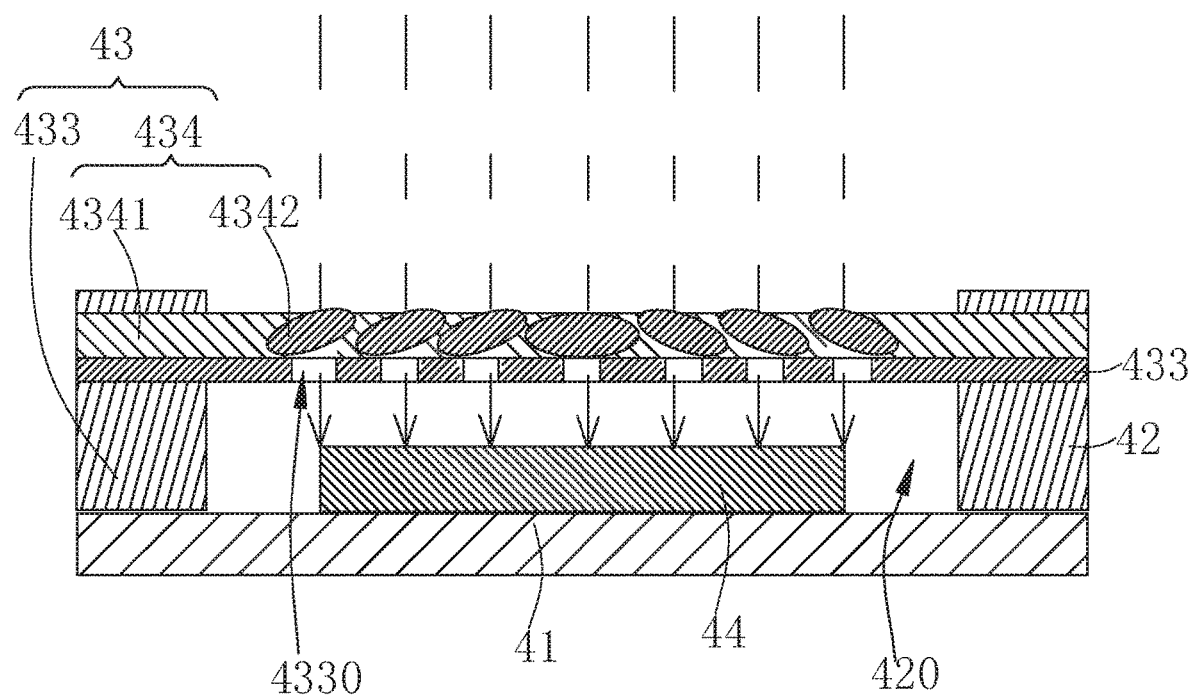
FIG. 4 is a schematically cut-away view of a lens module according to the fourth embodiment of the present invention.

In this embodiment, as shown in FIG. 4, most of the elements of the lens module 400 are same as those in Embodiment 3. However, the difference existed in EMBODIMENT 4 is detailed as below.

In this embodiment, the lens assembly 43 includes the micro-lens array 434 and the aperture sheet 433. The micro-lens array 434 includes a plurality of micro-lenses 4342 and the periphery 4341 surrounding the micro-lenses 4342. The micro-lens array 434 is fixed to the spacer 42 via the periphery 4341 with the micro-lenses 4342 received in the through hole 420 of the spacer 42. The aperture sheet 433 is attached on a side of the micro-lens array 434 close to the image sensor 44. The aperture sheet 433 also has a plurality of windows 4330 for passing through the incident light, each window is disposed corresponding to each of the micro-lenses 4342. The windows 4330 are spaced apart from each other with an even interval. In some use cases the scaling of the micro-lenses 4342 and windows 4330 can vary. This may allow more light to pass through the corresponding surface area of the image sensor 44.

Embodiment 5

Figure 5:
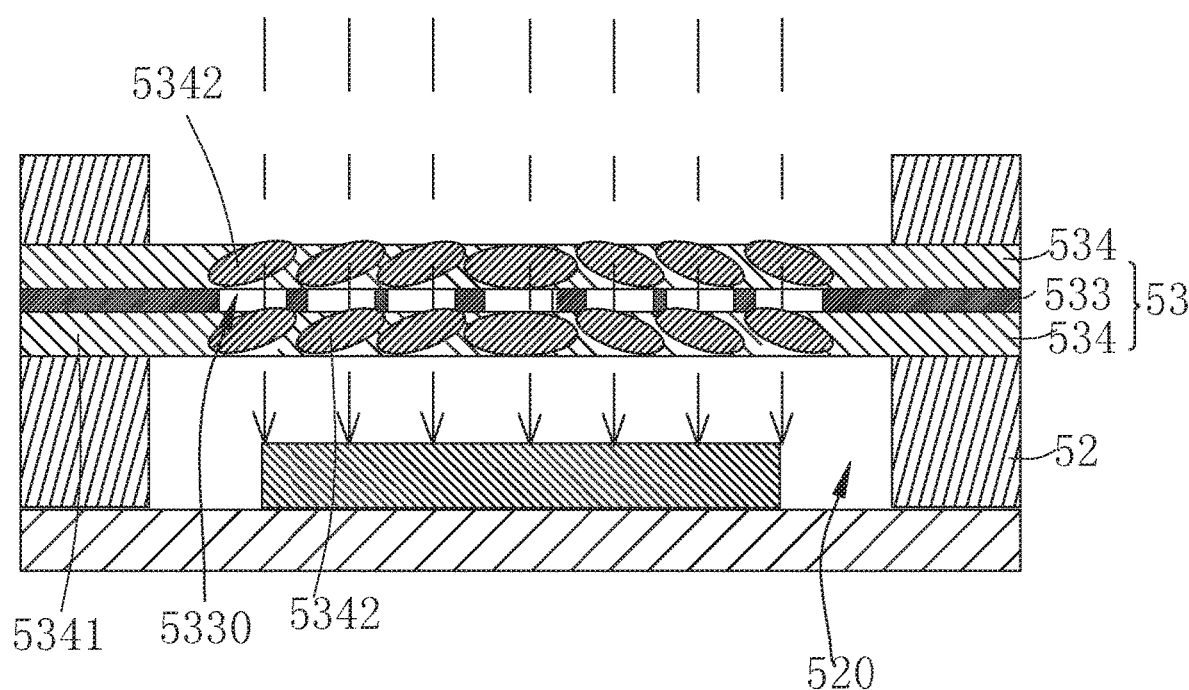
FIG. 5 is a schematically cut-away view of a lens module according to the fifth embodiment of the present invention.

In this embodiment, as shown in FIG. 5, most of the elements of the lens module 500 are same as those in Embodiment 3. However, the difference existed in EMBODIMENT 5 is detailed as below.

In this embodiment, the lens assembly 53 includes two micro-lens array 534 and the aperture sheet 533. The aperture sheet 533 is sandwiched between two micro-lens arrays 534. Each micro-lens array 534 has a plurality of micro-lenses 5342 and the periphery 5341 surrounding the micro-lenses 5342. The micro-lenses 5342 are received in the through hole 520, and the peripheries 5341 are fixed to the spacer 52. The micro-lenses of one micro-lens array are facing the micro-lenses of the other micro-lens array one by one. The aperture sheet 533 has a plurality of windows 5330, which are corresponding to the micro-lenses one by one. The incident light captured by the micro-lenses, and passing through the windows, and then captured by the micro-lenses of the other micro-lenses array, and then transmitted to the image sensor 54.

Embodiment 6

Figure 6:
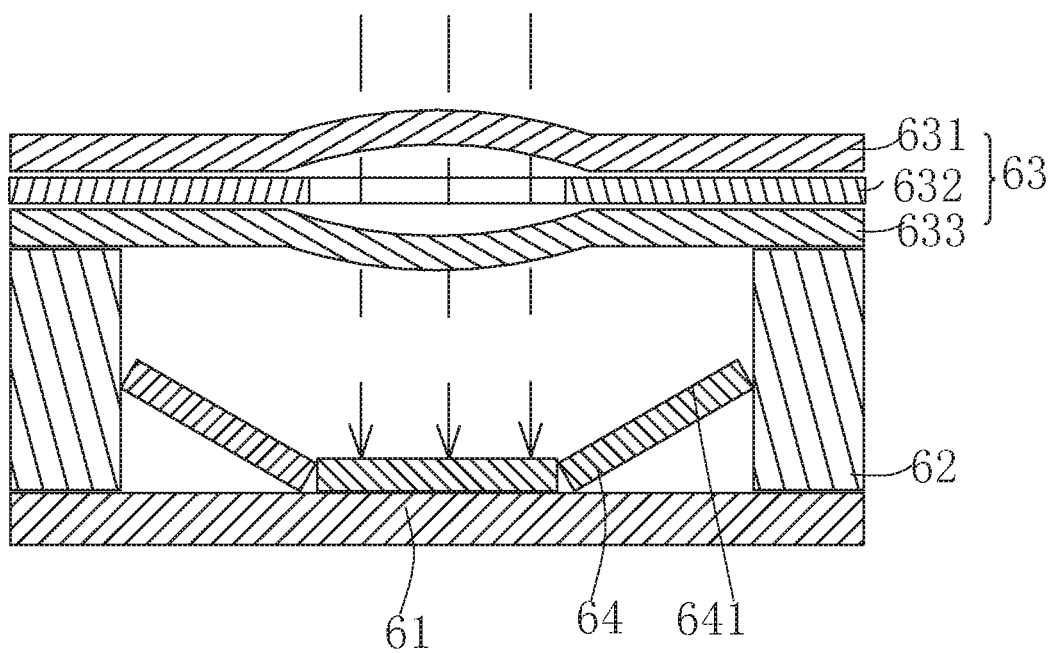
FIG. 6 is a schematically cut-away view of a lens module according to the sixth embodiment of the present invention.

In this embodiment, as shown in FIG. 6, most of the elements of the lens module 600 are same as those in Embodiment 1. However, the difference existed in EMBODIMENT 6 is detailed as below.

In this embodiment, the image sensor 64 is curved shaped. The image sensor 64 has a plurality of curved surface 641. The incident light transmitted via the lens assembly 63 is sensed by the plurality of curved surface 641, and then produce a lot of image signals. The neural network processed the image signals and the image signals can be combined into composite image by the neural network. The image sensor 64 may a mosaic image sensor.

Embodiment 7

Figure 7:
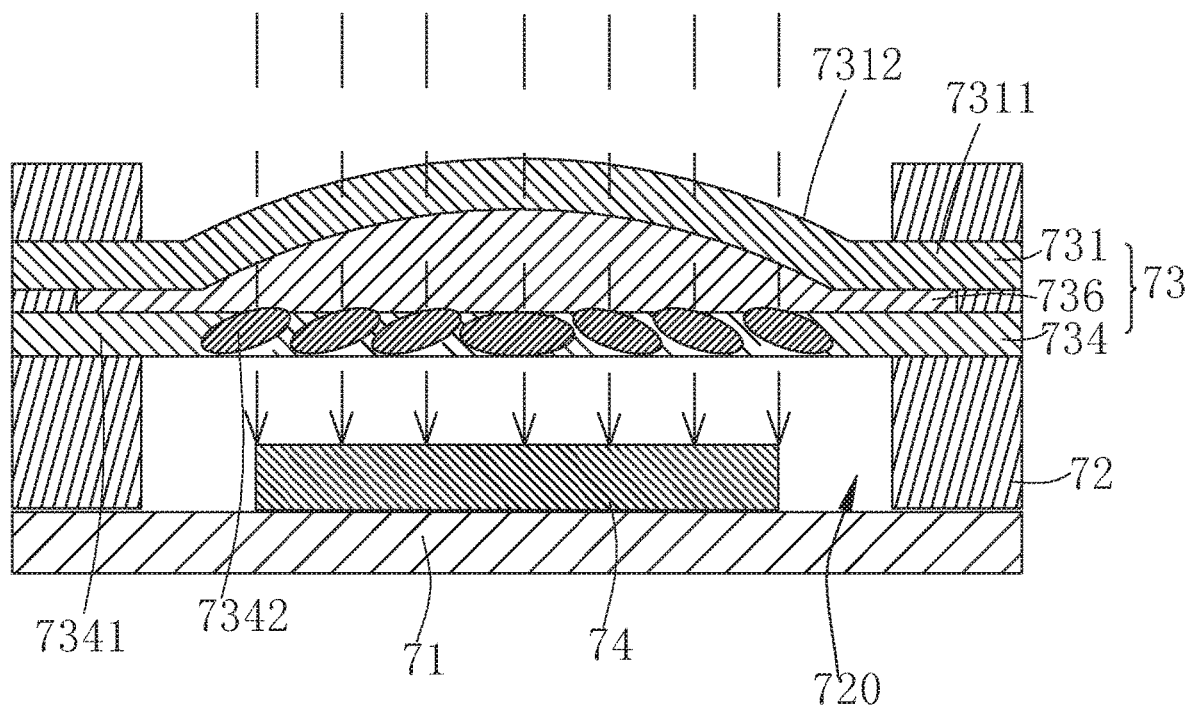
FIG. 7 is a schematically cut-away view of a lens module according to the seventh embodiment of the present invention.

In this embodiment, as shown in FIG. 7, most of the elements of the lens module 700 are same as those in Embodiment 3. However, the difference existed in EMBODIMENT 7 is detailed as below.

In this embodiment, the lens assembly 73 includes the first lens 731, a third lens 736 and the micro-lens array 734. The shape of the first lens 731 can be controlled by the piezo-film or SMA actuator. It is fixed to the spacer 72 via the fixing portion 7311 with the imaging portion 7312 received in the through hole 720. The lens assembly 73 can perform AF function due to actuator reshaping (curvature change) the first lens 731 and third lens 736. The third lens 736 is a filled cavity of optically behaving flexible material (e.g. liquid polymer gel). The third lens 736 is sandwiched between the first lens 731 and the micro-lens array 734. The fixing portion 7311 of the first lens 731 has a piezo-film or SMA actuator to perform the AF function and correct the lens errors. The micro-lens array 734 has a plurality of micro-lenses 7342 and the periphery 7341 surrounding the micro-lenses 7342. The micro-lenses 7342 are disposed corresponding to the imaging portion 7312. In this embodiment, the micro-lens array 734 is used as the aperture sheet.

Embodiment 8

Figure 8:
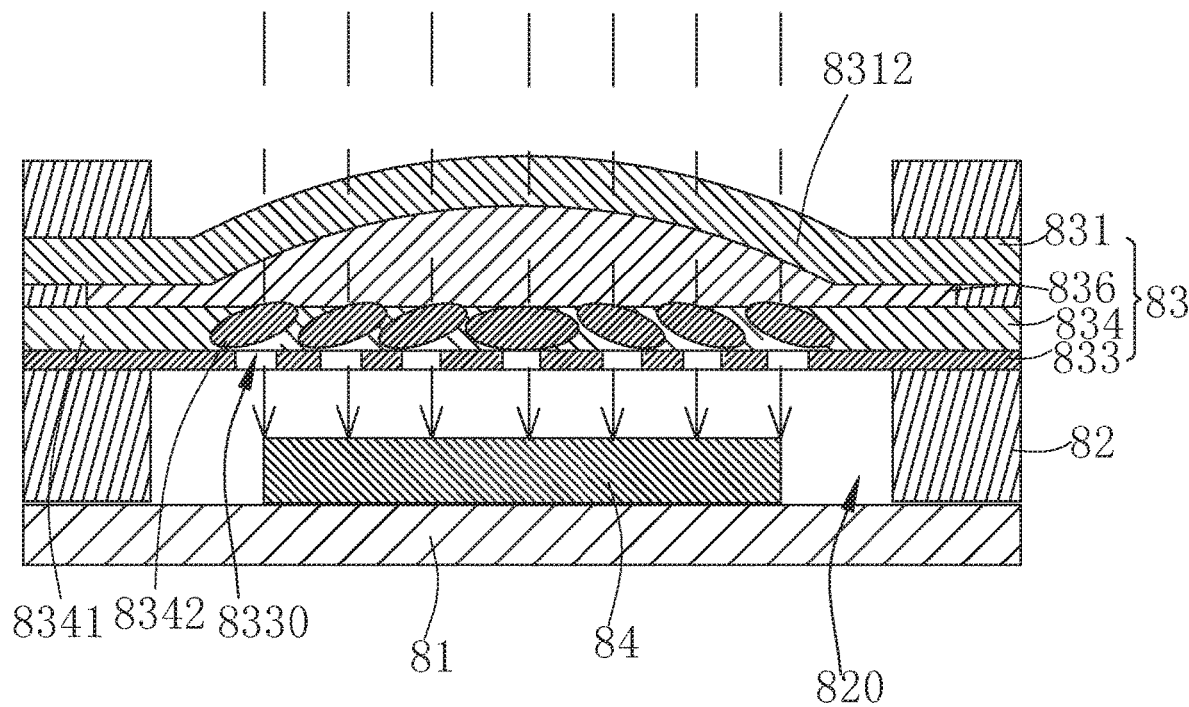
FIG. 8 is a schematically cut-away view of a lens module according to the eighth embodiment of the present invention

In this embodiment, as shown in FIG. 8, most of the elements of the lens module 800 are same as those in Embodiment 7. However, the difference existed in EMBODIMENT 8 is detailed as below.

In this embodiment, the lens assembly 83 includes the first lens 831, the third lens 836, the micro-lens array 834 and the aperture sheet 833. The first lens 831, the third lens 836, the micro-lens array 834 and the aperture sheet 833 are sequentially stacked upon each other in a direction toward the image sensor 84. The aperture sheet 833 has a plurality of windows 8330. Each window 8330 faces one of the micro-lens 8342. The incident light captured by the first lens 831, and passing through the third lens 836, and the micro-lenses 8342, incident into the image sensor 84 via the window 8330. The aperture sheet 833 may be coated with infrared-cut filter coating.

The individual images captured by the micro-lenses can be processed by the neural network to combine the individual images into composite image.

Figure 9:
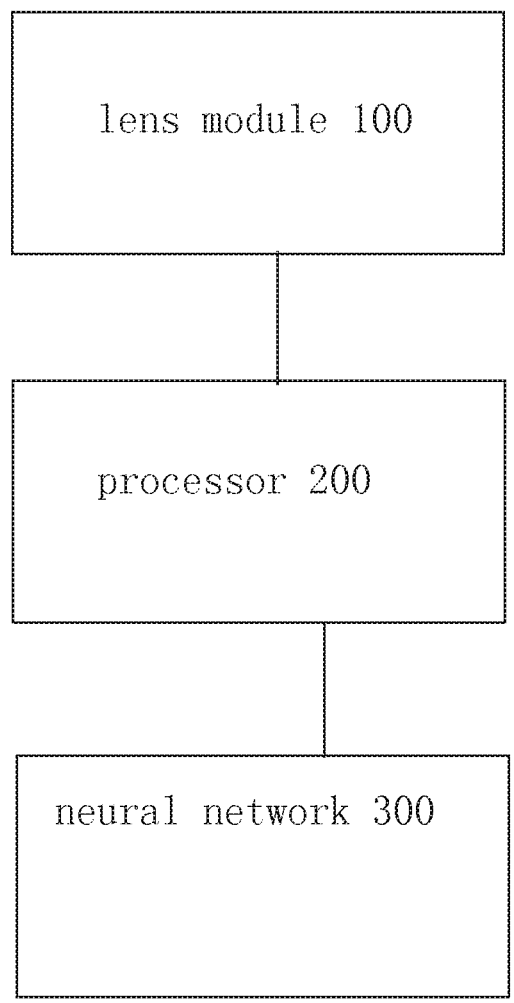
FIG. 9 is a schematically block view of a system for producing image according to the present disclosure.

In the present invention, as shown in FIG. 9, a system for producing an image includes: the lens module 100, a processor 200 electrically connected with the lens module 100, and a neural network 300 coupled to the processor 200.

The processor 200 and the neural network 300 operate as follows:

S1: many raw image signals are captured by the above-mentioned lens module 100, and then be sent to the processor 200; an object image signals also be pre-stored in the processor 200;

S2: the neural network processed all of the image signals and combined them into a composite image. Specifically, the neural network will be trained and finally produce the images similar to the object image.

S3: the composite image is displayed on an electric terminal, such as mobile phones. The composite image processed by the neural network has less blurriness and distortion.

In the present invention, the lens module may be a simple optics module and thinner than a related lens module. The lens module has an in-built field curvature and distortion removal of the optics, which can enable images stitching from narrow FOV to combine into a full FOV composite image.

The above is only the embodiment of the present invention, but not limit to the patent scope of the present invention, and the equivalent structures or equivalent process transformations made by utilizing the present invention and the contents of the drawings, or directly or indirectly applied to other related technology fields, are all included in the scope of the patent protection of the present invention.

What is claimed is:

1. A lens module, comprising:
a print circuit board,
a spacer, attached onto the print circuit board, and the spacer having a through hole;
a lens assembly, supported by the spacer and covering the through hole;
an image sensor, mounted on the print circuit board and electrically connected with the print circuit; wherein,
the lens assembly is configured for capturing light reflected by an object and transmitting the light into the image sensor;
the image sensor is configured for converting the light into raw image signals; the lens assembly comprises a micro-lens array, the micro-lens array comprises a plurality of micro-lenses and a periphery surrounding the micro-lenses; the micro-lenses received in the through hole, and the periphery attached to the spacer; the lens assembly further comprises an aperture sheet attached to a side of the micro-lens array close to the image sensor; the aperture sheet comprises a plurality of windows that face the micro-lenses one by one.

2. The lens module according to claim 1, wherein, the lens assembly comprises a first lens, a second lens, and an aperture sheet sandwiched between the first lens and the second lens; both of the first lens and the second lens have an imaging portion facing the image sensor and a fixing portion fixed to the spacer.

3. The lens module according to claim 1, wherein, the lens assembly further comprises another micro-lens array attached onto a side of the aperture sheet close to the image sensor; the micro-lenses face the windows, respectively.

4. The lens module according to claim 1, wherein, the image sensor has a plurality of curved surfaces for capturing the light.

5. The lens module according to claim 1, wherein, the lens assembly comprises a first lens and a third lens sandwiched between the first lens and the micro-lens array; the first lens comprises an imaging portion and a fixing portion; the imaging portion facing the micro-lenses with a gap; the third lens fulfilling the gap.

6. The lens module according to claim 5, wherein, the third lens is made of flexible material.

7. A system for producing image, comprising:
a lens module, comprising:
a print circuit board,
a spacer, attached onto the print circuit board, and the spacer having a through hole;
a lens assembly, supported by the spacer and covering the through hole;
an image sensor, mounted on the print circuit board and electrically connected with the print circuit; wherein,
the lens assembly is configured for capturing light reflected by an object and transmitting the light into the image sensor;
the image sensor is configured for converting the light into raw image signals; the lens assembly comprises a micro-lens array, the micro-lens array comprises a plurality of micro-lenses and a periphery surrounding the micro-lenses; the micro-lenses received in the through hole, and the periphery attached to the spacer; the lens assembly further comprises an aperture sheet attached to a side of the micro-lens array close to the image sensor; the aperture sheet comprises a plurality of windows that face the micro-lenses one by one;
a processor, electrically connected with the image sensor, the processor configured for receiving the raw image signals from the image sensor and pre-storing object image signals;
a neural network, coupled to the processor, and configured for:
receiving the raw image signals;
receiving the object image signals;
training the neural network, correcting the raw image signals according to the object image signals;
outputting an object image.

8. The system for producing image according to claim 7, wherein, the lens assembly comprises a first lens, a second lens, and an aperture sheet sandwiched between the first lens and the second lens; both of the first lens and the second lens have an imaging portion facing the image sensor and a fixing portion fixed to the spacer.

9. The system for producing image according to claim 7, wherein, the lens assembly further comprises another micro-lens array attached onto a side of the aperture sheet close to the image sensor; the micro-lenses face the windows, respectively.

10. The system for producing image according to claim 7, wherein, the image sensor has a plurality of curved surfaces for capturing the light.

11. The system for producing image according to claim 7, wherein, the lens assembly comprises a first lens, and a third lens sandwiched between the first lens and the micro-lens array; the first lens comprises an imaging portion and a fixing portion; the imaging portion facing the micro-lenses with a gap; the third lens fulfilling the gap.

12. The system for producing image according to claim 11, wherein, the third lens is made of flexible material.

* * * * *